United States Patent

Ozaki et al.

[11] Patent Number: 5,818,652
[45] Date of Patent: Oct. 6, 1998

[54] DEVICE FOR REPRODUCING A RECORDING MEDIUM HAVING PLURAL RECORDING AREAS

[75] Inventors: Shinya Ozaki, Kanagawa; Hiroshi Ishibashi; Toshiyuki Hirose, both of Tokyo, all of Japan

[73] Assignee: Sony Corporation, Tokyo, Japan

[21] Appl. No.: 666,779

[22] Filed: Jun. 19, 1996

[30] Foreign Application Priority Data

Jun. 23, 1995 [JP] Japan .................................... 7-158213

[51] Int. Cl.⁶ ............................... G11B 5/02; G11B 5/09; G11B 15/18
[52] U.S. Cl. .................................. 360/27; 360/48; 360/69
[58] Field of Search .................... 360/27, 48, 69

[56] References Cited

U.S. PATENT DOCUMENTS 4,852,105  7/1989  Kurz .......................................... 371/69
5,210,761  5/1993  Fukami et al. .......................... 371/40.1
5,276,561  1/1994  Fukami .................................... 360/32
5,559,644  9/1996  Ozaki et al. .............................. 360/48

Primary Examiner—Aristotelis M. Psitos
Assistant Examiner—Regina Y. Neal
Attorney, Agent, or Firm—Jay H. Maioli

[57] ABSTRACT

A data reproducing apparatus in which the identification information recorded in multiplicity on a recording track can be reliably reproduced assuring stable data reproduction including a decoder 61 to decode the area IDs supplied from an 8/10 demodulation circuit 43 and to supply each decoded area ID to counters C0 to C15, a system controller 70 to find the number of times of occurrences of coincidences of the area IDs of areas other than the end of data (EOD) area and, based on the frequency of detection of the occurrences of the area IDs by the counters C0 to C15, detects the area IDs of the (EOD) area. Finally, the system controller 70 controls the running of a magnetic tape 31 based on the detected area IDs.

13 Claims, 21 Drawing Sheets

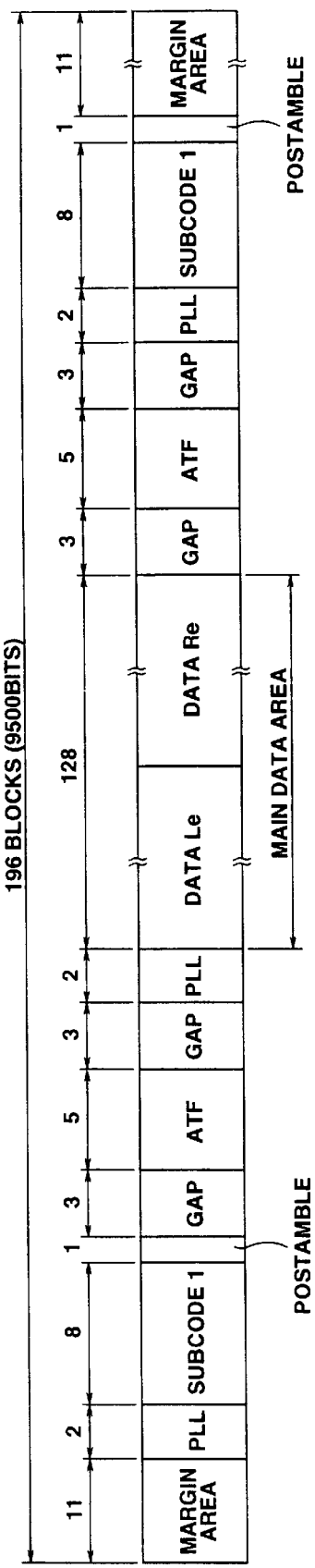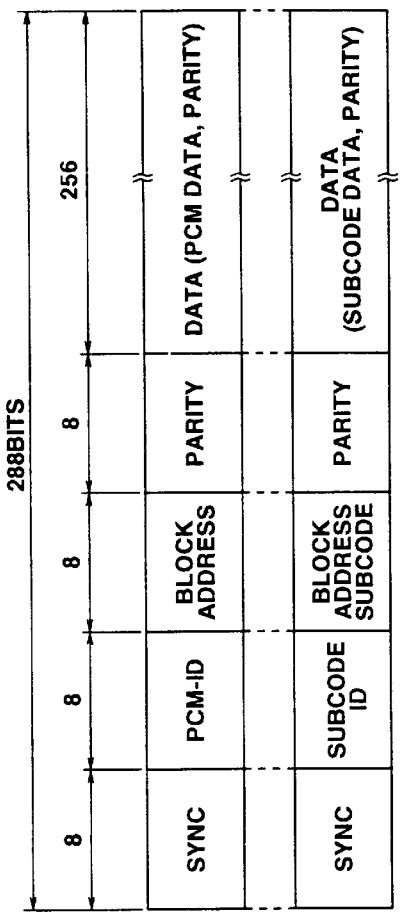

|     | msb |   |   |   |   | lsb |
| --- | --- | --- | --- | --- | --- | --- |
| PC1 | 0 | 0 | 0 | 1 | C | N POSITONS |
| PC2 | GROUP COUNT (MSB) ||||||
| PC3 | GROUP COUNT (LSB) ||||||
| PC4 | FILE MARK COUNT (MSB) ||||||
| PC5 | FILE MARK COUNT ||||||
| PC6 | FILE MARK COUNT ||||||
| PC7 | FILE MARK COUNT (LSB) ||||||
| PC8 | PARITY ||||||

FIG.15

|     | msb |   |   |   |   | lsb |
| --- | --- | --- | --- | --- | --- | --- |
| PC1 | 0 | 0 | 1 | 0 | 0 | N REPEAT |
| PC2 | SAVE SET MARK COUNT (MSB) ||||||
| PC3 | SAVE SET MARK COUNT (LSB) ||||||
| PC4 | RECORD COUNT (MSB) ||||||
| PC5 | RECORD COUNT ||||||
| PC6 | RECORD COUNT ||||||
| PC7 | RECORD COUNT (LSB) ||||||
| PC8 | PARITY ||||||

FIG.16

|     | msb |   |   |   | lsb |
| --- | --- | --- | --- | --- | --- |
| PC1 | 0 | 0 | 1 | 1 | AREA ID |
| PC2 | ABSOLUTE FRAME COUNT (MSB) ||||||
| PC3 | ABSOLUTE FRAME COUNT ||||||
| PC4 | ABSOLUTE FRAME COUNT (LSB) ||||||
| PC5 | TRACK 1 CHECK SUM (MSB) ||||||
| PC6 | TRACK 1 CHECK SUM (LSB) ||||||
| PC7 | LF-ID ||||||
| PC8 | PARITY ||||||

FIG.17

|     | msb |   |   |   | lsb |
| --- | --- | --- | --- | --- | --- |
| PC1 | 0 | 1 | 0 | 0 | AREA ID |
| PC2 | ABSOLUTE FRAME COUNT (MSB) ||||||
| PC3 | ABSOLUTE FRAME COUNT ||||||
| PC4 | ABSOLUTE FRAME COUNT (LSB) ||||||
| PC5 | TRACK 2 CHECK SUM (MSB) ||||||
| PC6 | TRACK 2 CHECK SUM (LSB) ||||||
| PC7 | LF-ID ||||||
| PC8 | PARITY ||||||

FIG.18

|     | msb |   |   |   | lsb |
| --- | --- | --- | --- | --- | --- |
| PC1 | 0 | 1 | 0 | 1 | NUMBER OF PREVIOUS RECORDING GROOVES |
| PC2 | NUMBER OF PREVIOUS RECORDING GROOVES ||||||
| PC3 | NUMBER OF PREVIOUS RECORDING GROOVES (LSB) |||||
| PC4 | NUMBER OF TOTAL RECORDING GROOVES (MSB) |||||
| PC5 | NUMBER OF TOTAL RECORDING GROOVES |||||
| PC6 | NUMBER OF TOTAL RECORDING GROOVES |||||
| PC7 | NUMBER OF TOTAL RECORDING GROOVES (LSB) |||||
| PC8 | PARITY |||||

FIG.19

|     | msb |   |   |   | lsb |
| --- | --- | --- | --- | --- | --- |
| PC1 | 0 | 1 | 1 | 0 | NUMBER OF PREVIOUS READOUT GROOVES |
| PC2 | NUMBER OF PREVIOUS READOUT GROOVES |||||
| PC3 | NUMBER OF PREVIOUS READOUT GROOVES (LSB) |||||
| PC4 | NUMBER OF TOTAL READOUT GROOVES (MSB) |||||
| PC5 | NUMBER OF TOTAL READOUT GROOVES |||||
| PC6 | NUMBER OF TOTAL READOUT GROOVES |||||
| PC7 | NUMBER OF TOTAL READOUT GROOVES (LSB) |||||
| PC8 | PARITY |||||

FIG.20

|     | msb |   |   |   |   |   |   | lsb |
| --- | --- | --- | --- | --- | --- | --- | --- | --- |
| PC1 | 0 | 1 | 1 | 1 | 0 | 0 | 0 | 0 |
| PC2 | TOTAL NUMBER OF REWRITE FRAMES (MSB) ||||||||
| PC3 | TOTAL NUMBER OF REWRITE FRAMES ||||||||
| PC4 | TOTAL NUMBER OF REWRITE FRAMES (LSB) ||||||||
| PC5 | COUNT OF TOTAL THIRD ECC COUNTS (MSB) ||||||||
| PC6 | COUNT OF TOTAL THIRD ECC COUNTS ||||||||
| PC7 | COUNT OF TOTAL THIRD ECC COUNTS (LSB) ||||||||
| PC8 | PARITY ||||||||

FIG.21

|     | msb |   |   |   |   |   |   | lsb |
| --- | --- | --- | --- | --- | --- | --- | --- | --- |
| PC1 | 1 | 0 | 0 | 0 | 0 | 0 | 0 | 0 |
| PC2 | LOAD COUNT (MSB) ||||||||
| PC3 | LOAD COUNT (LSB) ||||||||
| PC4 | NUMBER OF PREVIOUS REWRITE FRAMES (MSB) ||||||||
| PC5 | NUMBER OF PREVIOUS REWRITE FRAMES (LSB) ||||||||
| PC6 | COUNT OF PREVIOUS THIRD ECC (MSB) ||||||||
| PC7 | COUNT OF PREVIOUS THIRD ECC (LSB) ||||||||
| PC8 | PARITY ||||||||

FIG.22

| SUB-DATA BLOCK ADDRESS | 32BYTES ⟵⎯⎯⎯⎯⎯⎯⎯⎯⎯⟶ | | | |
|---|---|---|---|---|
| | 8 BYTES ⟵⟶ | PACK ITEM | | |
| 0000 | 5 | 7 | 3 | 3,4 |
| 0001 | 6 | 8 | 4 | C1 |
| 0010 | 5 | 7 | 3 | 3,4 |
| 0011 | 6 | 8 | 4 | C1 |
| 0100 | 5 | 7 | 3 | 3,4 |
| 0101 | 6 | 8 | 4 | C1 |
| 0110 | 5 | 7 | 3 | 3,4 |
| 0111 | 6 | 8 | 4 | C1 |
| 1000 | 5 | 7 | 3 | 3,4 |
| 1001 | 6 | 8 | 4 | C1 |
| 1010 | 5 | 7 | 3 | 3,4 |
| 1011 | 6 | 8 | 4 | C1 |
| 1100 | 5 | 7 | 3 | 3,4 |
| 1101 | 6 | 8 | 4 | C1 |
| 1110 | 5 | 7 | 3 | 3,4 |
| 1111 | 6 | 8 | 4 | C1 |

8BLOCKS (SUB1), 8BLOCKS (SUB2)

FIG.24

| SUB-DATA BLOCK ADDRESS | 8 BYTES | PACK ITEM | | |
|---|---|---|---|---|
| 0000 | 3 | 3 | 3 | 3,4 |
| 0001 | 4 | 4 | 4 | C1 |
| 0010 | 3 | 3 | 3 | 3,4 |
| 0011 | 4 | 4 | 4 | C1 |
| 0100 | 3 | 3 | 3 | 3,4 |
| 0101 | 4 | 4 | 4 | C1 |
| 0110 | 3 | 3 | 3 | 3,4 |
| 0111 | 4 | 4 | 4 | C1 |
| 1000 | 3 | 3 | 3 | 3,4 |
| 1001 | 4 | 4 | 4 | C1 |
| 1010 | 3 | 3 | 3 | 3,4 |
| 1011 | 4 | 4 | 4 | C1 |
| 1100 | 3 | 3 | 3 | 3,4 |
| 1101 | 4 | 4 | 4 | C1 |
| 1110 | 3 | 3 | 3 | 3,4 |
| 1111 | 4 | 4 | 4 | C1 |

(32 BYTES total width; upper 8 BLOCKS = SUB1, lower 8 BLOCKS = SUB2)

FIG.25

DEVICE FOR REPRODUCING A RECORDING MEDIUM HAVING PLURAL RECORDING AREAS

BACKGROUND OF THE INVENTION

1. Field of the Invention

This invention relates to a reproducing device improved in reliability of reproduction of the identification information and which may be provided with advantage in an identification information reproducing system for reproducing the identification information in data from an external source or playback data in, for example, a digital audio tape recorder apparatus or a data storage apparatus.

2. Description of the Related Art

There currently are digital audio tape recorders (DAT) in which, for improving the sound quality and for diminishing the magnetic tape length required for recording, a rotary head is used, and the speech as digital data is recorded and/or reproduced on or from a recording track inclined relative to the running direction of the magnetic tape.

With such DAT, 196 blocks of data is recorded in each track, as shown for example in FIG. 1A. In such recording track, 11 blocks of merging areas are provided on both ends thereof and, between these merging areas, there are provided eight blocks each of first and second sub-code areas for recording sub-codes, five blocks each of ATF areas for recording automatic track finding (ATF) signals for effecting tracking and a 128 blocks of a main data area for recording data.

The sub-code area and the main data area are each made up of a block made up of 288 bits. Each block defining the main data area is made up of an 8-bit synchronization signal, main IDs (W1 and W2) each composed of 8 bits, 8-bit parity as error correction code (ECC) and 256 bit PCM data, as shown in FIG. 1B. In each of the main IDs (W1 and W2), there are recorded PCM (pulse code modulation)-ID for specifying the quantization methods for speech signals and block addresses for identifying respective blocks.

Each block defining the subcode area is made up of an 8-bit synchronization signal, sub-IDs (W1, W2) each made up of 8 bits, parity code (ECC) of 8 bits, and sub-code data of 256 bits, as shown in FIG. 1C. In the sub-IDs (W1, W2) are recorded the sub-code ID specifying the sorts of the sub-code, block addresses for specifying the blocks, and the sub-code ID.

In part of the blocks of the main data area and in the respective blocks of the sub-code area, there are recorded data ID, control ID and block addressees, as the sub-code. Since these sub-codes are essential for reproducing the PCM data in the main data area, they are recorded eight times per track in redundancy.

If, during reproduction of the magnetic tape, recorded as described above, part of the sub-code becomes unable to be reproduced, such as by dropout, errors are detected during decoding which is a counterpart operation of ECC. With the DAT, if part of the sub-code cannot be reproduced, data reproduction is continued using other sub-codes for which no error has been detected during decoding.

Specifically, the DAT includes, in the sub-code reproducing system for reproducing the sub-code from the playback output of the magnetic head, a demodulator 101 for demodulating the playback output of the recording track reproduced by the magnetic head, an address data generator 102 for generating addresses for reproducing recorded data based on the demodulated output of the demodulator 101, and a multiplicity coincidence detector 103 for detecting multiplicity of the sub-code supplied from the demodulator 101, as shown in FIG. 2.

The multiplicity coincidence detector 103 includes a selector 111 for species-wise switching the sub-codes supplied from the demodulator 101 and outputting the selected sub-codes, and a double coincidence detection unit 112, a triple coincidence detection unit 113, and a quadruple coincidence detection unit 114 for detecting sub-code multiplicity.

The demodulator 101 sends the demodulated sub-code (Dsub) to the selector 111 which then outputs the demodulated sub-code to one of the double coincidence detection unit 112, triple coincidence detection unit 113 and the quadruple coincidence detection unit 114 as selected by species-wise switching and selection. Each of the double coincidence detection unit 112, triple coincidence detection unit 113 and the quadruple coincidence detection unit 114 detects whether or not the same sub-code, for which no error has been detected during reproduction, has been supplied in multiplicity a number of times exceeding a pre-set threshold value. The sub-codes supplied in multiplicity are deemed to be valid and outputted over a data bus $DT_{BUS}$.

Thus, if dropout has occurred or error correction is not feasible, such that part of the sub-codes becomes non-reproducible, the sub-code recorded in other positions can be used as valid sub-codes for reliable reproduction of recorded data, since the same sub-codes are recorded in redundancy. This technique is disclosed in detail in U.S. Pat. No. 5,210,761, filed on Oct. 1, 1990.

In a data storage device for recording data supplied from an information processing device on a magnetic tape, a device area from a physical beginning of tape (PBOT) to a logical beginning of tape (LBOT) is defined in a leading area next to the leader tape as an area for loading and unloading the magnetic tape, as shown in FIG. 8. Next to this device area are provided a reference area and a system area. The reference area is used as a physical reference in recording the system log (hysteresis information) in the system area. A main data area for recording data is provided next to the system area, while an end-of-data (EOD) area for indicating the end of the main data area is provided next to the main data area.

The recording track formed in each of these areas is configured similarly to that in the DAT and is made up of first and second sub-code areas and a main data area. In the first and second sub-code areas is recorded the identification information, such as area IDs, specifying to which one of the device area, reference area, system area and the main data area belong the recording track having the sub-code area. These area IDs are formed in multiplicity in the first and second subcode areas.

For reproduction, it is detected to which of the areas belongs the recording track being reproduced for controlling the tape running. With the data storage device, an area ID detected in redundancy a number of times exceeding a pre-set number of times is detected as being valid by a multiplicity coincidence unit provided in the identification information reproducing system configured for reproducing the identification information, such as area IDs, as in the case of the above-described sub-code detection in the DAT.

Thus, with the data storage device, if part of the area IDs cannot be reproduced, the area ID may be detected based on the playback output of the other area IDs for continuing data reproduction.

However, the above-mentioned DAT has a drawback that, if the subcode reproduced in multiplicity as described above is detected by the multiplicity coincidence detection unit, and the number of times of sub-code multiplicity is less than a threshold as set in the multiplicity coincidence detection unit, the sub-code becomes invalid, such that the PCM data in the main data area becomes unable to be reproduced.

In addition, with the above data storage device, if the number of times of the area ID multiplicity is less than the threshold as set in the multiplicity coincidence detection unit, the area ID is deemed to be invalid and fails to be detected, as in the case of sub-code detection in the above DAT. Thus the position on the tape of the recording track being reproduced cannot be detected and hence the playback cannot be achieved in stability.

On the other hand, since the area ID is recorded in redundancy with the data storage device, the above areas can be detected if only the area ID can be reproduced in the course of fast feed or rewind even if the recording track in its entirety is not reproduced. Consequently, with the data storage device, fast search can be carried out by running the tape at a fast speed to a target position as the area ID is reproduced for detecting the current area during fast feed or rewind.

If, during such fast search, the area ID becomes non-reproducible such that the current position on the tape cannot be detected, there is a risk of passing by the target position due to high tape running speed. If the target position is passed by, it becomes necessary to reverse the tape running direction to effect a further search thus increasing the time which elapses until reaching the target position. Furthermore, if, during such fast search, the area ID of the EOD area specifying the end position of the main data area cannot be detected, there is a risk that the tape be run to its end point, with the tape being occasionally destroyed.

SUMMARY OF THE INVENTION

It is therefore an object of the present invention to provide a reproducing device whereby the identification information, such as sub-code or area ID, recorded in redundancy on the recording track, can be reliably reproduced for stable data reproduction.

In one aspect, the present invention provides an apparatus for reproducing a series of data composed of plural blocks each having a pre-set length. The apparatus has circuitry for reproducing the same identification information arrayed at plural different positions in the block for identifying the block, detection circuitry for finding the reproduction frequency of the reproduced identification information for each sort of the identification information, and control circuitry for controlling data reproduction based on the reproduction frequency.

In another aspect, the present invention provides an apparatus for reproducing data from a recording medium having a recording area for recording the data and an end area specifying an end of said recording area, in which the recording area includes plural pre-set length blocks to a plurality of different positions of each of which is appended the same first identification information specifying that a given block is contained in the recording area, an in which the end area includes plural pe-set length blocks to a plurality of different positions of each of which is appended the same second identification information specifying that the block is contained in the end area. The apparatus has circuitry for driving the recording medium for reproducing data inclusive of the plural blocks from the recording medium, circuitry for reproducing the first identification information and the second identification information included in each block of the reproduced data, detection circuitry for finding the reproduction frequency of the reproduced first identification information and the reproduced second identification information, and control circuitry for controlling the data reproducing circuitry responsive to the first identification information and the second identification information based on the reproduction frequency.

BRIEF DESCRIPTION OF THE DRAWINGS

FIGS. 1A–1C show a recording format for one track of data recorded on a magnetic tape by a conventional DAT.

FIGS. 15 to 22 illustrate a data structure of pack items 1 through 8 making up the sub-data, respectively.

FIG. 24 illustrates the data structure of sub-data recorded in a sub-area of a recording track formed in a system log area in a system area of a magnetic tape by the data storage device.

FIG. 25 illustrates the data structure of sub-data recorded in a sub-area of a recording track formed in a reference area, part of a system area and an EOD area of a magnetic tape by the data storage device.

DESCRIPTION OF THE PREFERRED EMBODIMENTS

Figure 2:
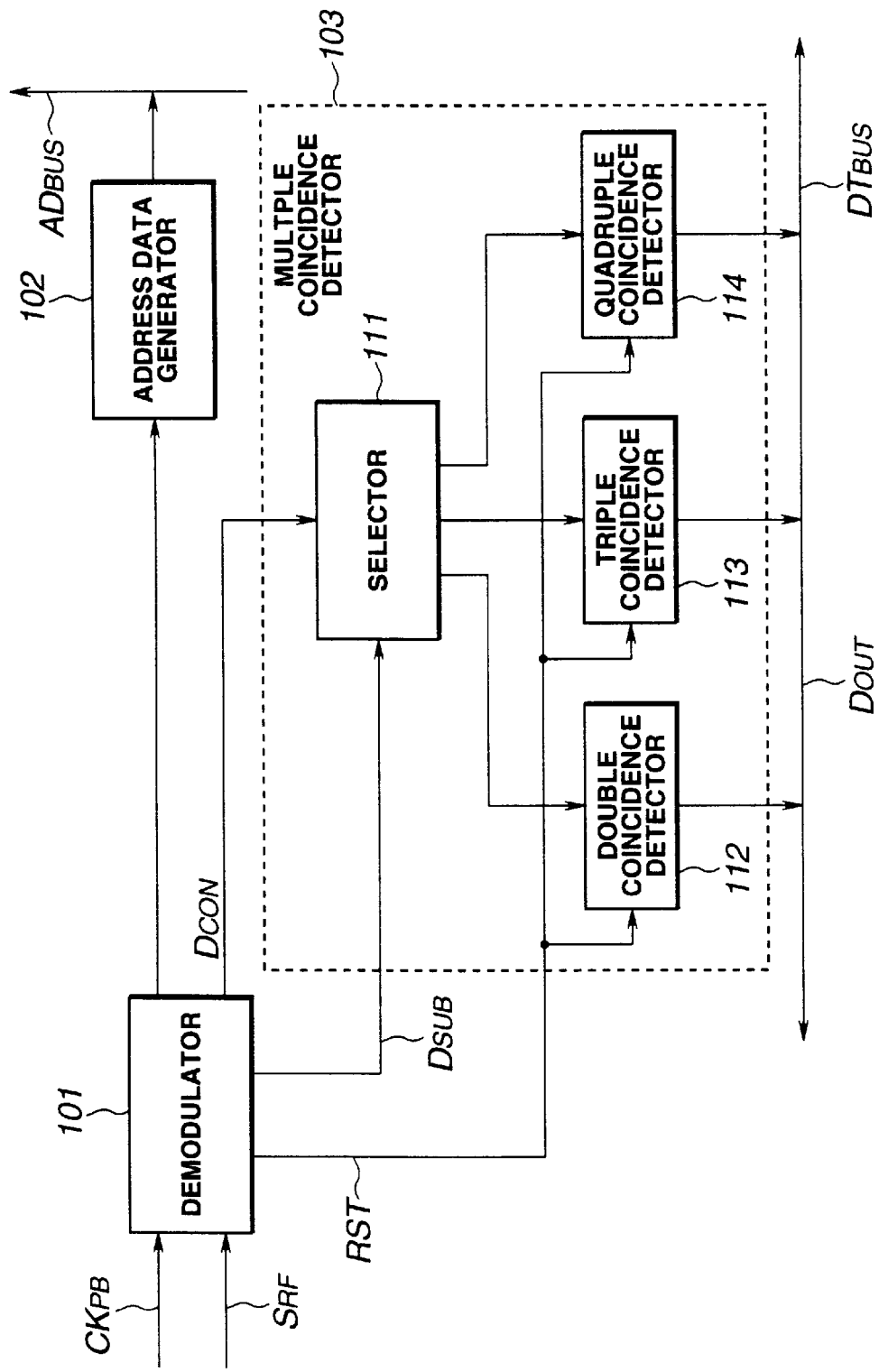
FIG. 2 is a block diagram showing the structure of a sub-code reproducing system for detecting the subcode in the conventional DAT.

Referring to the drawings, preferred embodiments of the present invention will be explained in detail. In the present embodiment, the reproducing device of the present invention is applied to a data storage device for recording/reproducing data from an information processing device, such as a personal computer or a work station, on or from a magnetic tape.

Figure 3:
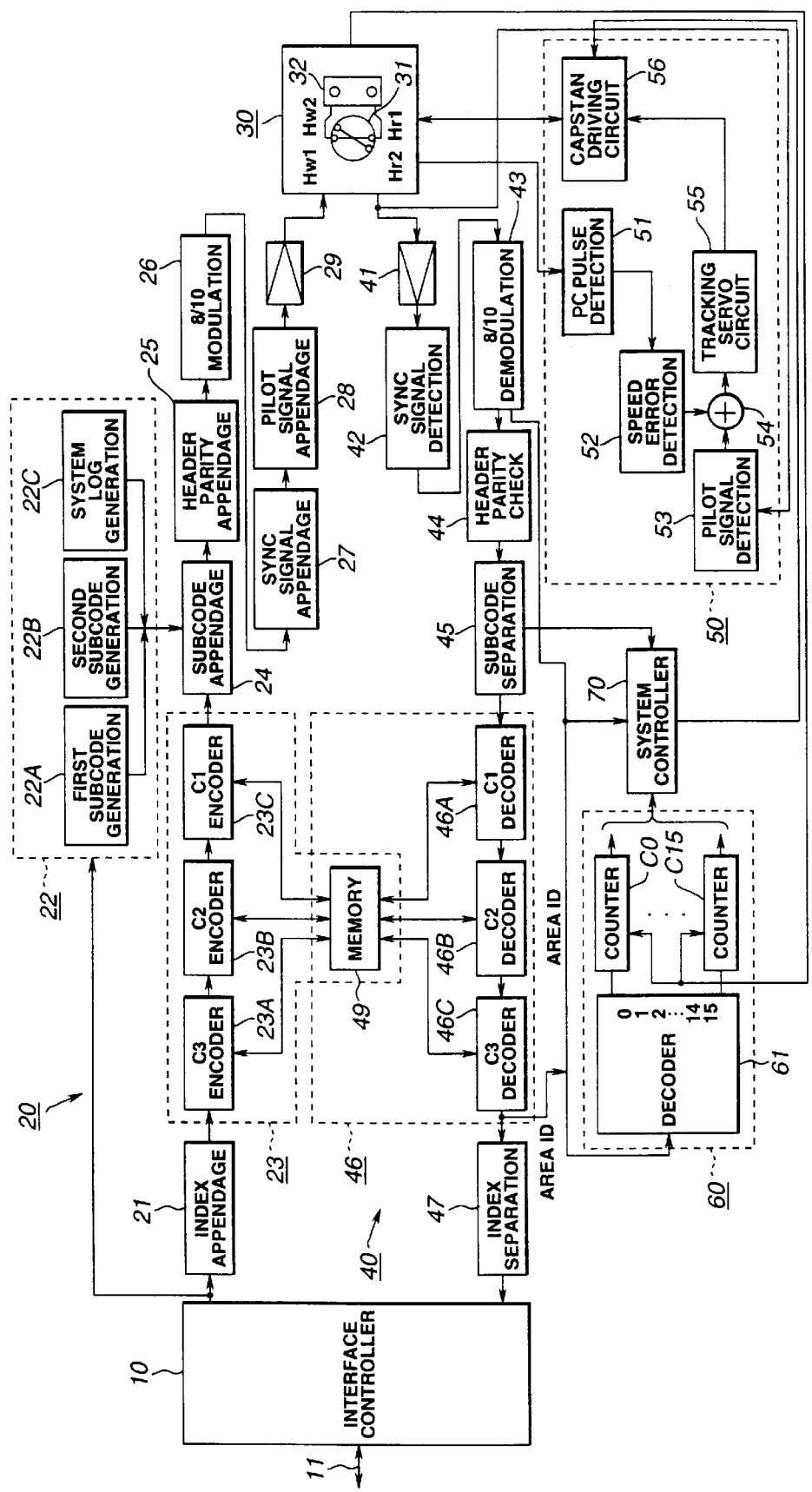
FIG. 3 is a block diagram showing the structure of a data storage device of an embodiment of the present invention in which the reproducing device of the present invention is applied to a data storage device.

The present data storage device includes an interfacing controller 10 for data exchange with outside, a recording data processing system 20 for processing data entering the interfacing controller 10 for converting the data to data of a pre-set format, and a recording/reproducing unit 30 for recording a signal supplied from the recording data processing system 20 on a magnetic tape and for reproducing the recorded data from the tape, as shown in FIG. 3. The data storage device also includes a playback data processing system 40 for processing the playback output of the recording/reproducing unit 30 for reproducing data recorded on the magnetic tape, and a tracking control system 50 for controlling the tape running system of the recording/reproducing unit 30.

The interfacing controller 10 is comprised of a small computer system interface (SCSI) and is configured for supplying data from the information processing devices, such as external personal computer or workstation, to the recording data processing system 20, and for supplying the recording data reproduced by the reproducing data processing system 40 to the information processing device.

The recording data processing system 20 includes an index appendage circuit 21 for appending the index information to recording data supplied via interfacing controller 10, and a subcode generator 22 for generating the sub-codes. The recording data processing system 20 also includes an error correction code generator 23 for error detection and correction of the recorded data from the index appendage circuit 21 and a subcode appendage circuit 24 for appending the sub-codes and the block address from the subcode generator 22 to the recorded data corrected for detected errors.

The subcode generator 22 includes first and second sub-code generators 22A, 22B and a system log generator 22C. The error correction code generator 23 is made up of a memory 49, a C3 encoder 23A, a C2 encoder 23B and a C1 encoder 23C.

The recording data processing system 20 includes a header parity appendage unit 25 for appending header parity to recording data from the subcode appendage unit 24, and an eight-to-fourteen (8/10) modulation unit 26 for modulating the recording data from the header parity appendage unit 25 with 8/10 modulation. The recording data processing system 20 also includes a synchronization signal appendage unit 27 for appending the synchronization signal to the recording data supplied from the 8/10 modulation unit, and a pilot signal appendage unit 28 for appending pilot signals for ATF (automatic track finding) for tracking control to the recording data supplied from the synchronization signal appendage unit 27. The recording data processing system 20 additionally includes an amplifier 29 for amplifying recording data supplied from the pilot signal appendage unit 28.

The recording/reproducing unit 30 includes a rotary drum 31 adapted for rotating two recording magnetic heads $H_w1$, $H_w2$ having different azimuth angles and two reproducing magnetic heads $H_r1$, $H_r2$ having different azimuth angles. These two pairs of the magnetic heads $H_w1$, $H_w2$, $H_r1$, $H_r2$ are arranged at a pre-set angle relative to a magnetic tape 32. These two pairs of magnetic heads are mounted in proximity to the circumference of the rotary drum 31 at an interval equal to a track pitch Tp along the axis of the rotary drum 31, that is along the track width.

The playback data processing system 40 includes an amplifier 41 for amplifying the playback output of the inclined track of the magnetic tape 32 supplied from the recording/reproducing unit 30, and a synchronization signal detection unit 42 for detecting the synchronization signal from the playback output supplied from the amplifier 41, converting the playback output into bi-level signals, correcting the bi-level signal with respect to jitter and outputting the resulting signal. The playback data processing system 40 also includes an 8/10 demodulation unit 43 for demodulating the reproduced bi-level signal from the synchronization signal detection unit 42 with eight-to-ten (8/10) demodulation, and a header parity check unit 44 for checking the header parity of the reproduced data from the 8/10 demodulation unit 43.

The playback data processing system 40 also includes a subcode separation unit 45 for separating the sub-codes from the reproduced data from the header parity check unit 44, and an error correction unit 46 for error correction of the reproduced data from the subcode separation unit 45 freed of the sub-codes. The playback data processing system 40 also includes an index separation unit 47 for separating the index from the reproduced data corrected for errors by the error correction unit 46. The error correction unit 46 is made up of a memory 49, a C1 decoder 46A, a C2 decoder 46B and a C3 decoder 46C.

The tracking control system 50 includes a PC detection unit 51 supplied from the recording/reproducing unit 30 with PC pulses corresponding to the rotation of the rotary drum 31, and a speed error detection unit 52 for detecting speed errors from a detection output of the PC detection unit 51. The tracking control system 50 also includes a pilot signal detection unit 53 for detecting an ATF pilot signal from the reproduced output of the recording/reproducing unit 30, and an adder 54 for summing detection outputs of the pilot signal detection unit 53. The tracking control system 50 further includes a tracking servo circuit 55 for generating a tracking servo signal based on the sum output of the adder 54 and a capstan driving circuit 56 for controlling the tape running system of the recording/reproducing unit 30.

With the present data storage device, the magnetic tape 32 is run at a pre-set running speed during recording/reproduction. The running speed of the magnetic tape is set so that two recording tracks of the magnetic tape are traversed during one complete revolution of the rotary drum. If data is recorded in this state, recording tracks $T_A$, $T_B$ are alternately formed at an interval of one track pitch $T_p$ by the magnetic heads $H_w1$, $H_w2$ having an interval equal to $T_p$ along the track width, as shown in FIG. 4.

Figure 4:
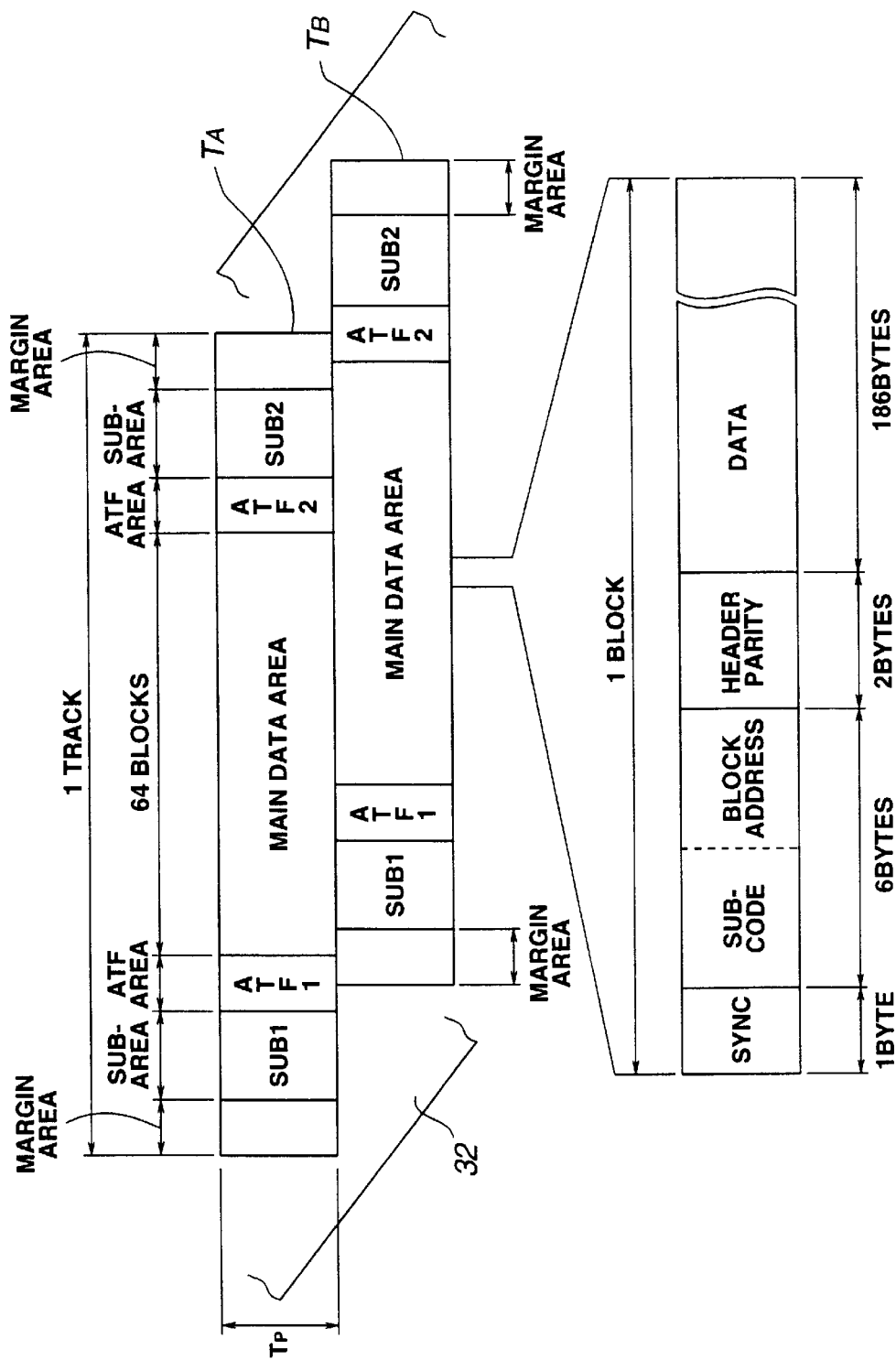
FIG. 4 illustrates the structure of a recording track recorded on a magnetic tape by the data storage device.

Each of the recording tracks $T_A$, $T_B$ is made up of a main data area for recording the recording data, an ATF area for recording the pilot signal for ATF (ATF signal), a sub-area for recording sub-IDs or sub-data, and a margin area, as shown in FIG. 4. The ATF area, sub-area and the margin area are provided on both ends of the main data area. Each track is made up of a margin area, a sub-area, a main data area, an ATF area, a sub-area and a margin area in this order.

Also, with the present data storage device, the main data area is divided into 64 blocks, with each block being made up of 195 bytes. Each block is divided into a 1-byte first domain for recording a synchronization signal, a 6-byte second domain for recording a sub-code and a block address, a 2-byte third domain for recording a header parity and a 186-byte fourth domain for recording data. The subcode and the block address are recorded along with the data in each block.

Figure 5:
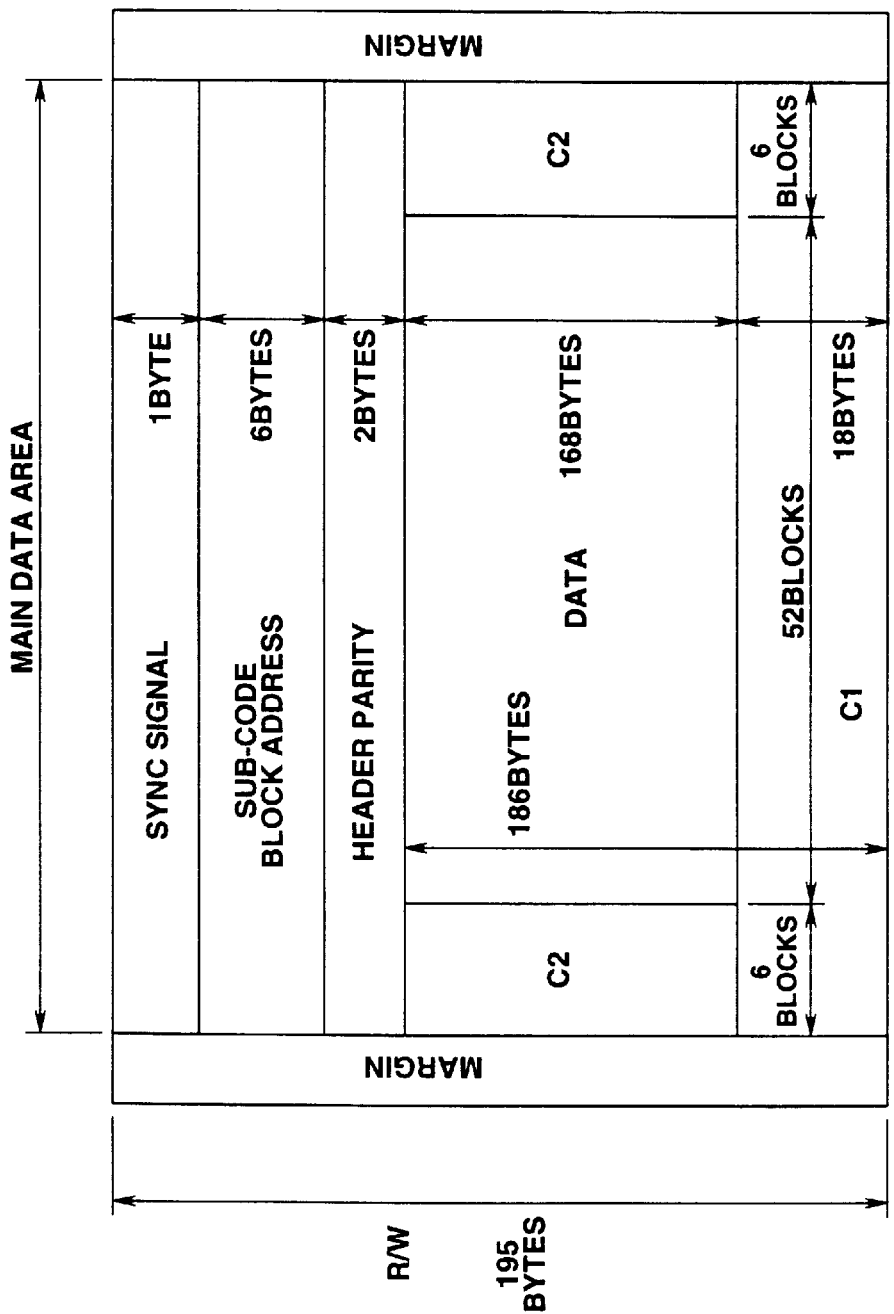
FIG. 5 illustrates the structure of one-track data recorded on a magnetic tape by the data storage device.

The data recorded in the fourth domain is 168 bytes by 52 blocks equal 8736 bytes to which two-dimensional error correction codes C2 and C1 are appended to give 186 bytes by 64 blocks, as shown in FIG. 5. As shown therein, the error correction code C1 is appended to and recorded with the main data of each block, while the error correction code C2 is divided in two and recorded in six blocks each at both ends of the main data area.

Figure 6:
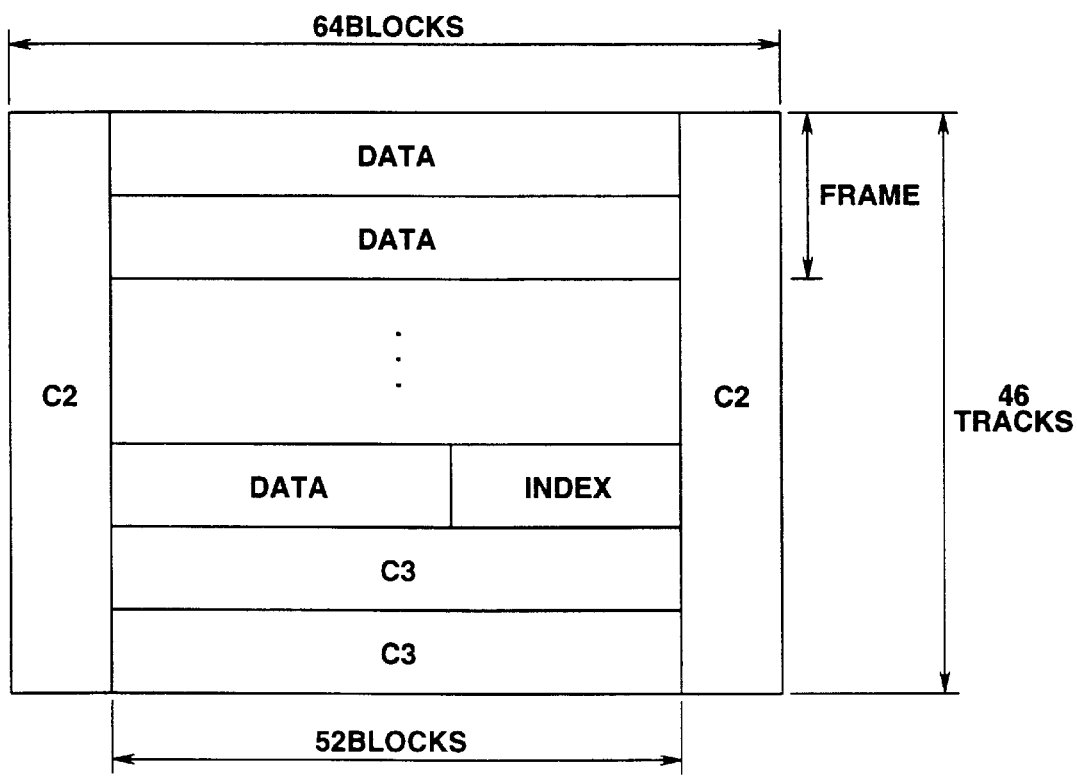
FIG. 6 illustrates the structure of data of one unit of 46 tracks recorded on a magnetic tape by the data storage device.

With the present data storage device, a code configuration for error correction is used in which two tracks, that is 128 blocks, are arranged as a frame and 46 tracks or 23 frames are arranged as one group. The error correction code C2 of a data string along the tracking direction is arranged on both sides of a track, while an error correction code C3 of a data string corresponding to the track width is allocated to and recorded in two trailing side ones of the 46 tracks, as shown in FIG. 6. The index information for demarcating the series of data is appended per each group.

As the sub-code, a separator count, which is the demarcation information for specifying the demarcation of main data, a record count specifying the number of records, an area ID specifying the areas defined on the tape format, a frame number specifying the absolute position of recording groups, a group count specifying the number of recording groups, and a check sum, for example, are recorded.

Figures 7A, 7B:
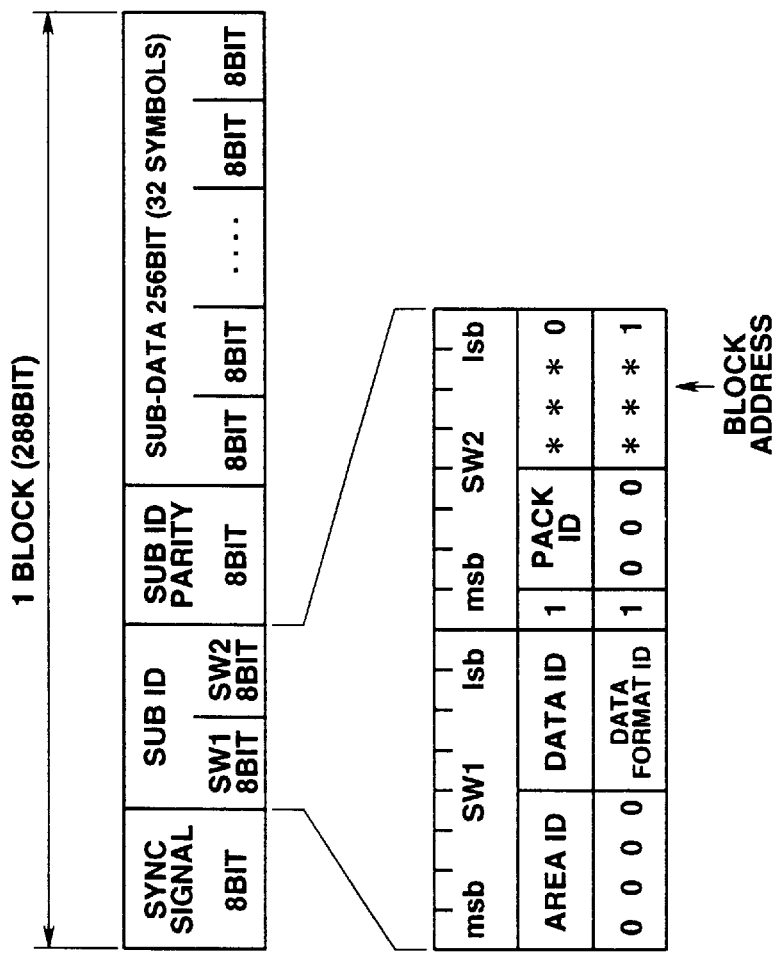
FIGS. 7A and 7B illustrate the structure of a block recorded on a sub-area of a magnetic tape by the data storage device.

Each sub-area (sub1 and sub2) is divided into eight blocks, with each block being made up of 288 bits. Each block is made up of an 8-bit synchronization signal, a 16-bit sub-IDs (SW1 and SW2), an 8-bit sub-ID parity and 246-bit sub-data, as shown in FIG. 7A. A block address is assigned to each block and is recorded in lower four bits of the sub-ID (SW2).

In a block having an even-numbered block address, that is a block having 0 at the lowermost bit of the sub-ID (SW2), a 4-bit area ID as the sub ID (SW1 and SW2), a 4-bit data ID, a 1-bit 1, a 3-bit pack ID and a 4-bit block address, are recorded, as shown at an upper row of FIG. 7B. In a block having an odd-numbered block address, that is a block having 1 at the lowermost bit of the sub-ID (SW2), a 4-bit "0000", as sub-ID (SW1 and SW2), a 4-bit data format ID, a 1-bit 1, 3-bit "000" and a 4-bit block address are recorded, as shown at an upper row of FIG. 7B.

In these blocks, the same contents are recorded four times, in each sub-area (sub1 and sub2), that is eight times in each recording track.

Figure 8:
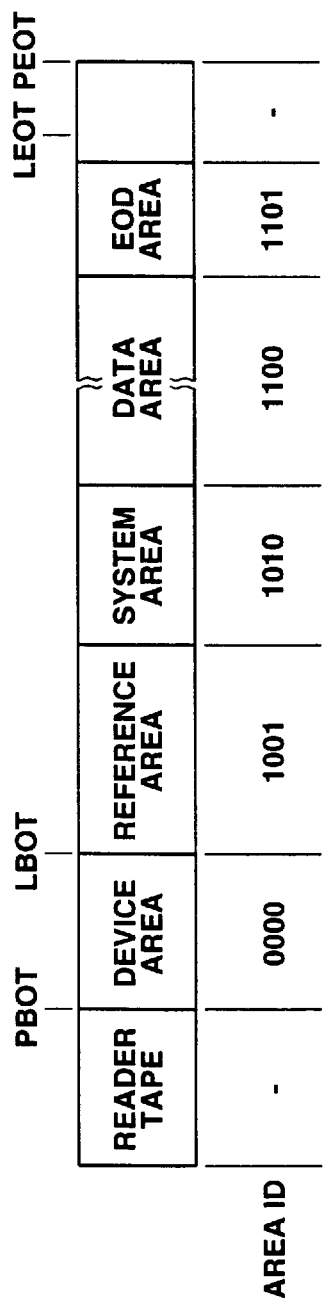
FIG. 8 illustrates a tape format of a magnetic tape on which data is recorded by the storage device.

In the present data storage device, a device area from a physical beginning of tape (PBOT) to a logical beginning of tape (LBOT), is prescribed by the tape format in a leading area contiguous to the leader tape as an area for magnetic tape loading and unloading, as shown in FIG. 8. Next to the device area are provided a reference area and a system area. The reference area is used as a physical reference for recording the system log (hysteresis information) in the system area. A data area for recording data is provided next to the system area, and an end-of-data (EOD) area is provided next to the data area.

The area IDs for respective areas are set so that the area IDs for the device area, reference area, system area, data area and the EOD area are 0000, 1001, 1010, 1100 and 1101, respectively. Since these area IDs are recorded in blocks having even-numbered block addresses, they are recorded eight times in total in two sub-areas for one track.

Figure 9:
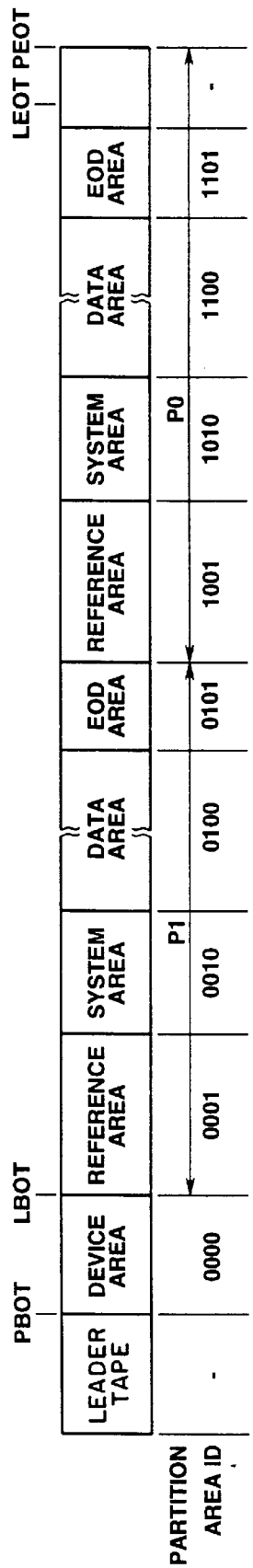
FIG. 9 illustrates a tape format of a 2-partition tape of the magnetic tape.

With the present data storage device, a two-partition tape having two partitions P1 and P0, each having a reference area, a system area, a data area and an EOD area, is prescribed, as shown in FIG. 9.

The system log (hysteresis information) for the partitions P1 and P2 is recorded in the system area of the partition P1. By recording the system log (hysteresis information) for both partitions P1 and P2 in the system area of the partition P1, the recording/reproducing time for the partitions may be diminished since it suffices to reproduce/record only the system log of the partition P1 during tape loading/unloading.

The area Ids of the respective areas of the two-partition tape are prescribed so that the area ID for the device area is 0000 and the area IDs of the reference area, system area, data area and the EOD area of the partition P1 are 0001, 0010, 0100 and 0101, respectively, while those of the reference area, system area, data area and the EOD area of the partition P0 are 1001, 1010, 1100 and 1101, respectively. These area IDs are recorded eight times in all for the two sub-areas (sub1 and sub2), as in the case of the tape format shown in FIG. 8.

The present data storage device is so arranged that, during reproduction of a magnetic tape, it is detected to which of the device area, reference area, system area, data area and the EOD area belongs the recording track, the area ID of which has been detected and which is currently reproduced, for detecting magnetic tape running. To this end, the data storage device includes a histogram formulating unit 60 for finding the reproducing frequency of the area IDs supplied from the playback data processing system from one area ID to another for formulating a histogram, and a system controller 70 for controlling the operation of the overall device, such as recording, playback, fast feed, rewind or stop based on the histogram formulated by the histogram formulating unit 60, as shown in FIG. 3.

The histogram formulating unit 60 includes a decoder 61 for decoding the area ID supplied from the 8/10 demodulator 43 and counters C0 to C15 for finding the reproducing frequency of each area ID based on each decoding output of the decoder 61. The counters C0 to C15 are supplied from the recording/reproducing unit 30 with counter clear signals per each scanning of the reproducing magnetic heads $H_r1$, $H_r2$, that is per revolution of the rotary drum 31, responsive to scanning of the reproducing magnetic heads $H_r1$, $H_r2$.

Since the reproducing magnetic heads $H_r1$, $H_r2$ are provided in proximity to the circumference of the rotary drum 31, the playback outputs of the reproducing magnetic heads $H_r1$, $H_r2$ are supplied substantially simultaneously via the amplifier 41 to the synchronization signal detection unit 42, however, it is corrected for jitter by synchronization signal detection unit 42, such that the playback output of the magnetic head $H_r2$ is delayed, while the playback outputs of the magnetic heads $H_r1$, $H_r2$ are continuously supplied to the 8/10 demodulator 43.

In this manner, while the counter clear signals are supplied per each revolution of the rotary drum 31, the playback output for two tracks is supplied to the 8/10 modulating unit 43, while 16 area IDs recorded in sub-areas of two tracks are supplied to the decoder 61. Therefore, the counters C0 to C15 are designed to count the area IDs recorded in the sub-areas of the two tracks, such that, if all of the area IDs are correctly reproduced, the count value of one of the counters C0 to C15 becomes equal to 16.

The operation of the present data storage device is explained. With the present data storage device, recording data is supplied via interface controller 10 from an information processing device, such as a personal computer or a work station, in advance of recording. If supplied over bus 11 with the recording data, the interface controller 10 routes the supplied recording data to the index appending unit 21 and to a sub-code generator 22.

If supplied with the recording data from the interface controller 10, the index appendage unit 21 appends the index information for identification of a series of recording data to each group of the 46 tracks or 23 frames, and routes the recording data with the appended index information to the error correction code generator 23.

The error correction code generator 23 transiently stores the recording data, supplied from the index appendage unit 21, in terms of data groups as units in the memory 49. The C3 encoder 23A generates the error correction code C3 of a data string along the track width for each group of the recording data recorded in the memory 49, and allocates the error correction code C3 to the last two tracks of the 46 tracks forming the group of data. The C2 encoder 23B generates the error correction code C2 for the data string corresponding to the track direction and divides the error correction code C2 into two portions which are allocated to both end portions of the main data area. The C1 encoder 23C generates the above-mentioned block-based error correction code C1.

The first sub-code generating portion 22A of the sub-code generator 22 generates a record count specifying the number of records and the separator count as the demarcation information specifying the demarcation of recording data. The second sub-code generator 22B generates, along with the block addresses, the check sum or the group count specifying the number of records, frame number or the area IDs specifying the areas defined on the tape format. The system log generator 22C generates system logs (hysteresis information) for each partition P1 or P0 prescribed as the tape format.

The sub-code appendage unit 24 appends the block addresses and the sub-codes supplied from the subcode generator 22 to the recording data to which the error correction codes C3, C2 and C1 have been appended by the error correction code generator 23. In this manner, the sub-code and the block address are allocated to the second domain of each block. The sub-code appendage unit 24 allocates the area IDs and the block addresses, generated by the second sub-code generator 22B, to the respective blocks of the two sub-areas (sub1 and sub2). Also the sub-code appendage unit 24 constitutes sub-data from the check sum, group count, area IDs generated by the second sub-code generator 22B and the count value generated by the first sub-code generator 22A, and allocates the sub-data to respective blocks of the two sub-areas.

The header parity appendage unit 25 generates a 2-byte parity for error correction for the block address and the sub-code appended to the recording data by the sub-code appendage unit 24, and appends the two-byte parity to the recording data, this allocating the 2-byte parity to the third domain of each of the above blocks. In addition, the header parity appendage unit 25 appends 1-byte parity shown in FIG. 5A to each block of the two sub-areas (sub1 and sub2).

The 8/10 modulation unit 26 converts the recording data of each block of two sub-areas and the recording data of the main data area, to which the header parity and the block address have been appended by the header parity appendage unit 25, from 8 bits as one byte to 10 bits, for maintaining the substantially zero dc level of the recording signal.

The synchronization signal appendage unit 27 appends the synchronization signal block-by-block to the recording data converted by the 8/10 modulator 26 into 10-bit data. This allocates the synchronization signal to the first domain of each block. The recording data, thus produced, is supplied to the pilot signal appendage unit 28.

The pilot signal appendage unit 28 generated pilot signals for ATF which are appended to the recording data. The resulting recording data with the appended pilot signal are supplied via amplifier 29 to the magnetic heads $H_w1$, $H_w2$. The magnetic heads $H_w1$, $H_w2$ then scan the magnetic tape for forming a recording track on the magnetic tape as shown in FIG. 4.

If, with the present data storage device, the recorded magnetic tape is reproduced, the recording/reproducing unit 30 controls the rotation of the rotary drum 31 so that the number of revolutions of the rotary drum 31 will be equal to that during recording, while controlling the running of the magnetic tape 32 so that the magnetic tape 32 will run at a pre-set velocity. This causes the reproducing magnetic heads $H_w1$, $H_w2$ to scan the magnetic tape with a tilt so that the magnetic heads $H_w1$, $H_w2$ will supply the reproducing output to the synchronization signal detection unit 42 via amplifier 41 responsive to the scanning of the recording track. The synchronization signal detection unit 42 detects the synchronization signals from the supplied playback output and converts the playback output into bi-level signals by the clocks synchronized with the synchronization signals to produce playback data which is supplied to the 8/10 demodulator 43.

The 8/10 demodulator 43 converts the playback data from the synchronization signal detection unit 42 from 10-bit data into 8-bit data which is supplied to the header parity check unit 44. The header parity check unit 44 performs parity check of the sub-code and the block address using the 2-byte header parity. The sub-code separation unit 45 separates the correct sub-code, parity-checked by the parity check unit 44, from the reproduced data, and routes the sub-code to the system controller 70, while routing the playback data separated form the sub-code to the memory 49.

The memory 49 transiently stores the playback data, to which the index information has been appended as described above, with the playback data of the 46 tracks or 23 frames as a group. The C1 decoder 46A corrects errors in the playback data of each block, that is the group-based playback data stored in the memory 49, using the error correction code C1 appended to each block.

The C2 decoder 46B corrects errors in the data string corresponding to the track direction, that is the group-based playback data error corrected by the C1 decoder 46A, using the error correction code C2 appended to both ends of the playback data area of each track. The C3 decoder 46C corrects errors in the data string corresponding to the track width direction, that is the group-based playback data error corrected by the C2 decoder 46B, using the error correction code C3 allocated to two last tracks of the 46 tracks as the group.

With the present data storage device, since the playback data is corrected for errors using the error correction codes C1, C2 and C3, it becomes possible to correct errors in the playback data reliably, thus improving reliability in the playback data.

The index separator 47 separates the index information from the group-based playback data, error corrected by the error correction unit 46 as described above, and routes the separated index information to, for example, the system controller 70. The playback data, freed of the index information, is supplied to the interface controller 10.

The interface controller 10 routes the playback data from the index separation unit 47 to, for example, a personal computer or a workstation. The 8/10 modulation unit 43 routes the reproduced data to the header parity check unit 44, while routing the 4-bit area ID, extracted from the reproduced data, to the decoder 61 of the histogram formulating unit 60. The decoder 61 decodes the area ID, supplied thereto, and routes each decoded output to the counters C0 to C15.

The counters C0 to C15 count decoded outputs of the decoder 61 and route the count values to the system controller 70. Thus, the reproducing frequency of each area ID, that is the histogram of each area ID, is found as a count value of each of the counters C0 to C15.

The system controller 70 compares the area ID with the maximum occurrence frequency depending on the histogram of the area ID thus found to a pre-set threshold value. If the reproducing frequency is larger than the threshold value, this area ID is deemed to be the area currently reproduced. The system controller 70 controls, for example, the tape running, depending on the area ID.

If, in detecting the number of times of multiplicity of the reproduced area ID by multiplicity coincidence detection, the area ID becomes unable to be reproduced due to, for example, dropout in the magnetic tape, such that the number of multiplicity of the area IDs becomes smaller than the threshold value, the area ID cannot be detected. Conversely, with the present data storage device, if the area ID cannot be reproduced intermittently, the area ID having the maximum reproducing frequency depending on the histogram of the area ID as found by the histogram formulating unit 60 may be compared to a threshold value and may be deemed as valid, thus enabling the area ID to be detected reliably.

Depending on the state of error occurrence, the number of the area ID having the maximum number of times of reproduction is not necessarily one. Thus it may be desirable to set the order of priority for the case in which the numbers of times of reproduction of the respective area IDs are equal. In such case, since it is necessary to detect the EOD area reliably for reproduction or fast feed, a higher value is set for the priority order for the area ID for the EOD area. If the order of priority is changed responsive to the playback or search operations, the area IDs can be suitably set for respective operations.

It is unnecessary to prepare and detect a histogram for each area ID. Thus it is possible to prepare and detect the histogram only for an area ID of, for example, the EOD area and to detect other area IDs by, for example, conventional multiplicity coincidence detection. This diminishes the number of the counters C0 to C15 provided in the histogram formulation portion and hence the circuit scale. In this case, the histogram is prepared for the area ID of the EOD area, and the system controller 70 counts the number of times the area ID of the same area is supplied continuously from the 8/10 modulation portion 43 or the sub-code separating portion 45 for the area ID of each area other than the EOD area. To this end, the system controller 70 has a multiplicity coincidence detector 103 shown in FIG. 25. If the histogram shows that the reproducing frequency of the area ID of the EOD area is larger than a pre-set threshold value, the area ID of the EOD area is deemed to be valid. If the histogram shows that the reproducing frequency of the area ID of the EOD area is smaller than a pre-set threshold value, the count value of the number of times the area ID of the same area is continuously supplied is compared to a pre-set threshold. If the count value is larger than the threshold value, the detected area ID is deemed to be valid.

The threshold value for normal reproduction may be set so as to differ from that for fast search by fast feed or rewind. During fast search, the system controller 70 controls the capstan driving circuit 56 or the like, as the area ID is reproduced in accordance with instructions from a personal computer or a work station, for running the magnetic tape until detection of the area ID of the instructed area. If the EOD area is detected before detection of the target area, it is necessary to stop the tape instantly to perform a control operation of reversing the running direction of the magnetic tape. Thus, for fast search, it is desirable to use a smaller value of the threshold for detecting the area ID of the EOD area for raising the detection sensitivity.

To this end, the threshold for fast search is pre-set to a value smaller than the threshold for normal reproduction. That is, if the threshold for normal reproduction is 7, the threshold value for fast search is set to 1.

During normal reproduction, the system controller 70 compares the number of times of detection of the area ID of the EOD area per revolution of the rotary drum 31 (referred to hereinafter as count value eodc) to the threshold value for normal reproduction, or 7, based on the histogram for the area ID supplied from the histogram formulating unit 60, in accordance with the flowchart shown in FIG. 10. The count value eodc corresponds to the count values of the area ID of the EOD areas of the partitions P1 and P0.

When the magnetic tape has started to be reproduced, the system controller 70 transfers to step S1. At step S1, the system controller 70 decides whether or not the count value eodc of the area ID of the EOD area is larger than the threshold value 7. If the count value eodc is smaller than the threshold value, the currently reproduced area is judged not to be the EOD area. If, at step S1, the count value eodc is larger than the threshold value, the currently reproduced area is judged to be an EOD area. The processing then transfers to step S2.

At step S2, the system controller 70 judges whether or not the area ID of the EOD area, detected by the histogram or multiplicity coincidence, is an area ID of the EOD area of the partition P1 ("0101"). If the detected area ID is 0101, this area ID is deemed to be valid. If the detected area ID is not 0101, processing transfers to the nest step S3.

At step S3, the system controller 70 judges whether or not the area ID of the EOD area, detected by the histogram or multiplicity coincidence, is an area ID of the EOD area of the partition P0 ("1101"). If the detected area ID is 1101, this area ID is deemed to be valid. If the detected area ID is not 0101, this area ID is deemed to be invalid.

It is also possible to detect the area ID by multiplicity coincidence detection at the same time as the histogram for the area ID is formed in order to make decisions of the steps S2 and S3 for the area ID detected by this multiplicity coincidence detection.

Figure 11:
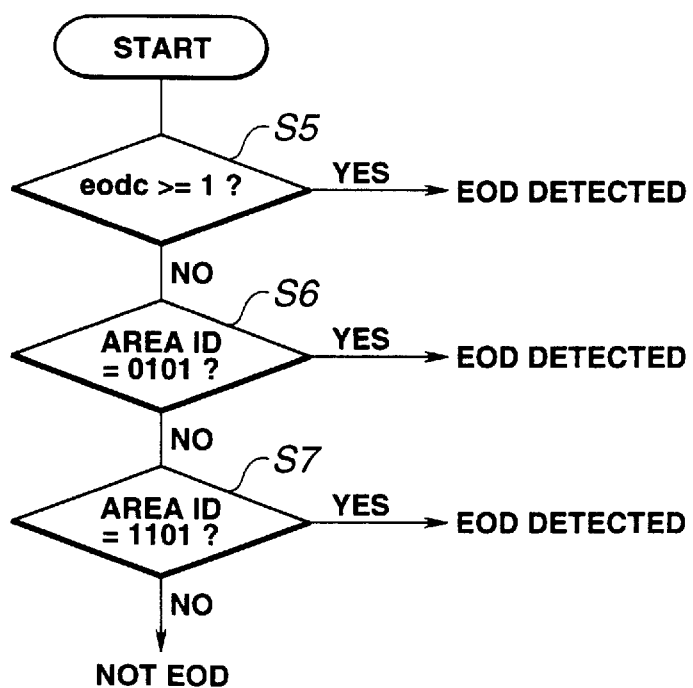
FIG. 11 is a flowchart for illustrating the search operation of usual data with the data storage device.

During fast search, the histogram formulating unit 60 formulates the histogram for each area ID, as during normal reproduction, in order to transmit the histogram to the system controller 70. The system controller 70 compares the number of times of detection of the area ID of the EOD area to the threshold value for fast search or 1, based on the histogram for the area ID supplied from the histogram formulating unit 60 as described above, in accordance with the flowchart shown in FIG. 11.

If fast search is started, the system controller 70 transfers to step S5. At step S5, the system controller 70 judges whether or not the count value eodc, that is a count output for the area ID of the EOD area per revolution of the rotary drum 31, is not less than the threshold value 1. If the count value is larger than the threshold value, the area ID of the EOD area detected by, for example, multiplicity coincidence detection, is deemed to be valid. Since this detects the EOD area, the system controller 70 performs control operations, such as halting the tape running.

If, at step S5, the count value eodc is smaller than the threshold value, processing transfers to the next step S6. At step S6, the system controller 70 detects whether or not the area ID detected by, for example, multiplicity coincidence detection, is an area ID of the EOD area of the partition P1 ("0101"). If the detected area ID is "0101", the system controller deems this area ID to be valid, and performs the control operation, such as halting the tape running. If otherwise, processing transfers to step S7.

At step S7, the system controller 70 detects whether or not the detected area ID is an area ID of the EOD area of the partition P0 ("1101"). If the detected area ID is "1101", the system controller deems this area ID to be valid, and performs the control operation, such as halting the tape running. If otherwise, fast search is continued on the assumption that the EOD area has not been detected.

For fast search, the detection sensitivity for the area ID of the EOD area needs to be higher than for normal reproduction for reliably detecting the area ID of the EOD area. Thus, even if the count value eodc for the area ID of the EOD area is smaller than the threshold value, the area ID for the EOD area is again detected at steps S6 and S7 based on a detection output by multiplicity coincidence detection.

Conversely, for normal reproduction, even if the count value eodc for the area ID of the EOD area of the histogram is larger at step S1 than the threshold value, the area ID for the EOD area is again detected at steps S2 and S3 based on a detection output by multiplicity coincidence detection for prohibiting mistaken detection of the EOD area.

Thus, with the present data storage device, the area ID is detected by multiplicity coincidence during normal reproduction for prohibiting mistaken detection of the EOD area, whereas, for fast search, the area ID is detected based on the histogram for raising EOD area detection sensitivity. That is, with the present data storage device, detection sensitivity of the EOD area can be adjusted depending on the sorts of operations. Meanwhile, detection sensitivity may also be adjusted by detecting the area ID by multiplicity coincidence in addition to histogram, not only for the EOD area but also for other areas, and by switching between different area IDs, depending on the sorts of the operations.

During fast search, the tape running speed may also be controlled depending on the detected area ID. If, in such case, an area ID of an area spaced apart from the target area, such as an area ID of a reference area or a system area, is detected, the tape running speed is increased. As the area ID for an area closer to the target area, such as a data area, is detected, the tape speed is slowed gradually. This expedites the search, while allowing the magnetic tape to be halted reliably at the target area.

The area ID detection method may also be switched depending on the operation type, such as reproduction or fast search. In such case, the system controller 70 controls tape running during normal reproduction using an area ID detected by multiplicity coincidence, while controlling tape running during fast search using the area ID as found by the counters C0 to C15. This enables detection of the area ID suited for the operation type.

The above description has been made with reference to an instance in which the areas ID recorded in the sub-area as the sub IDs are detected for detecting various areas on the tape. However, since the area IDs are recorded as the sub-codes in the main data area of each recording track as described above, it is also possible for the 8/10 demodulation unit to demodulate not only the area IDs of the sub-areas but also the area IDs of the main data area and to transmit the resulting demodulated outputs to the histogram formulating unit.

In addition to the sub-IDs, area IDs are recorded as sub-data in each block in the sub-areas. That is, 256-bit sub-data, recorded in the sub-areas of the recording tracks of the data area, are made up of four pack items, each made up of 64 bits or 8 bytes.

Figure 10:
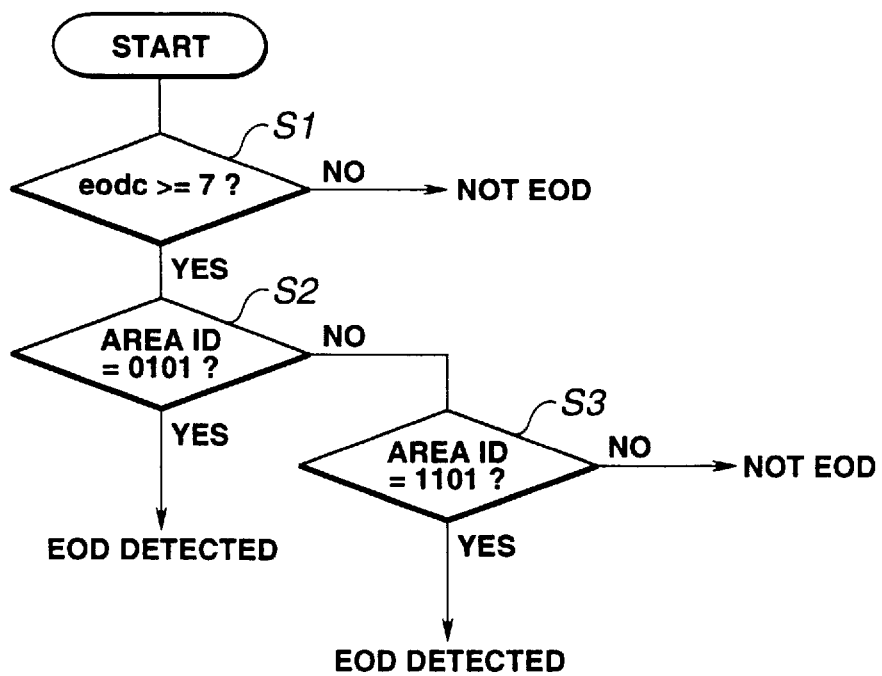
FIG. 10 is a flowchart for illustrating the reproduction of usual data with the data storage device.

As shown in FIG. 10, if the pack ID of the sub-ID is "110", the sub-data recorded in the sub-areas of the recording tracks formed in the data area is made up of pack items 1, 2, 3 and so forth, and of pack items 1, 2 and 4 and C1 parity, if the block address is even-numbered or odd-numbered, respectively.

Figure 12:
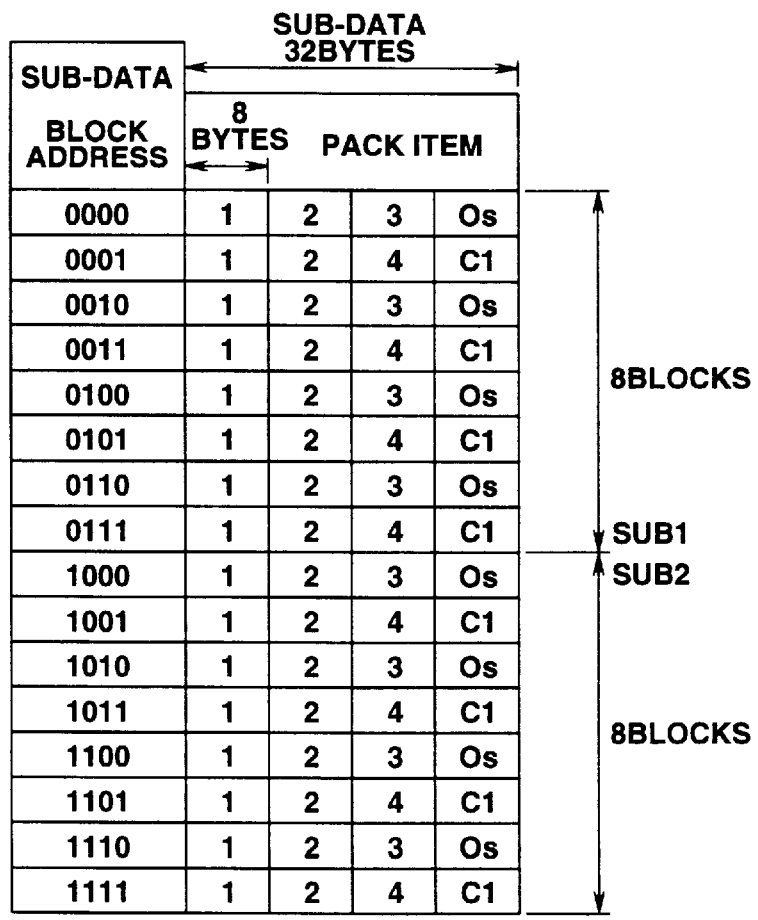
FIG. 12 illustrates a data structure of sub-data recorded in a sub-area of a recording track formed in a data area of a magnetic tape by the data storage device.

The pack ID specifies the number of pack items contained in two blocks. FIG. 12 shows the arraying, with respect to the block addresses, of the pack items in the sub-data of the respective blocks making up the sub-areas (sub1 and sub2).

Figure 13:
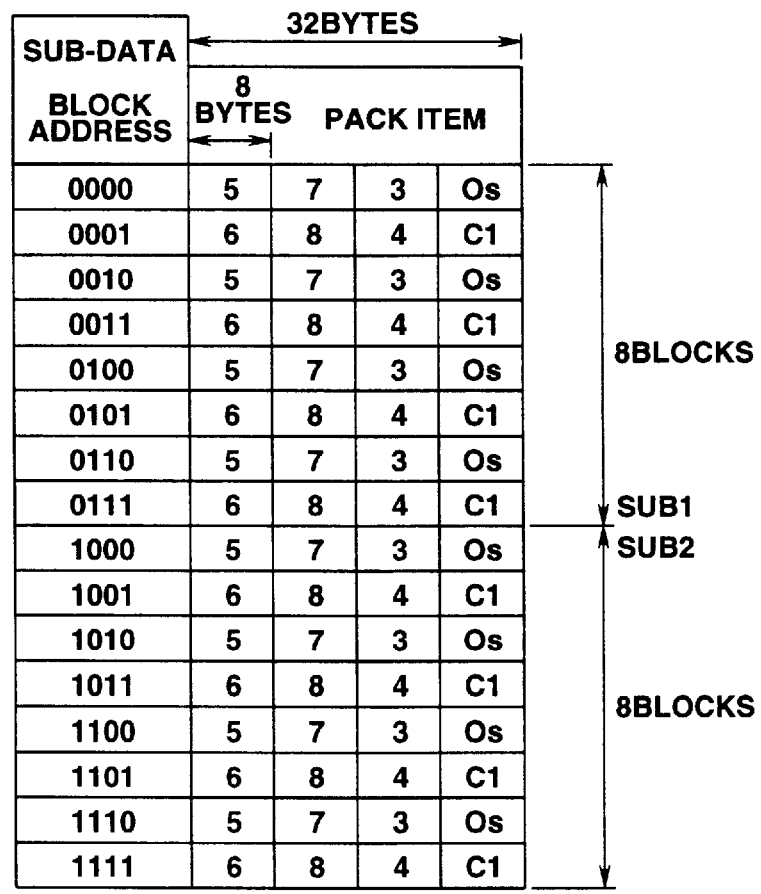
FIG. 13 illustrates a data structure of sub-data recorded in a sub-area of a recording track formed in a system log area of a system area of a magnetic tape by the data storage device.

As shown in FIG. 13, the sub-data recorded in the sub-area of the recording track of the system log area in the system area is made up of pack items 5, 7, 3 and so forth and of pack items 6, 8 and 4 and the C1 parity for blocks having even-numbered block addresses and for blocks having odd-numbered addresses, respectively.

Figure 14:
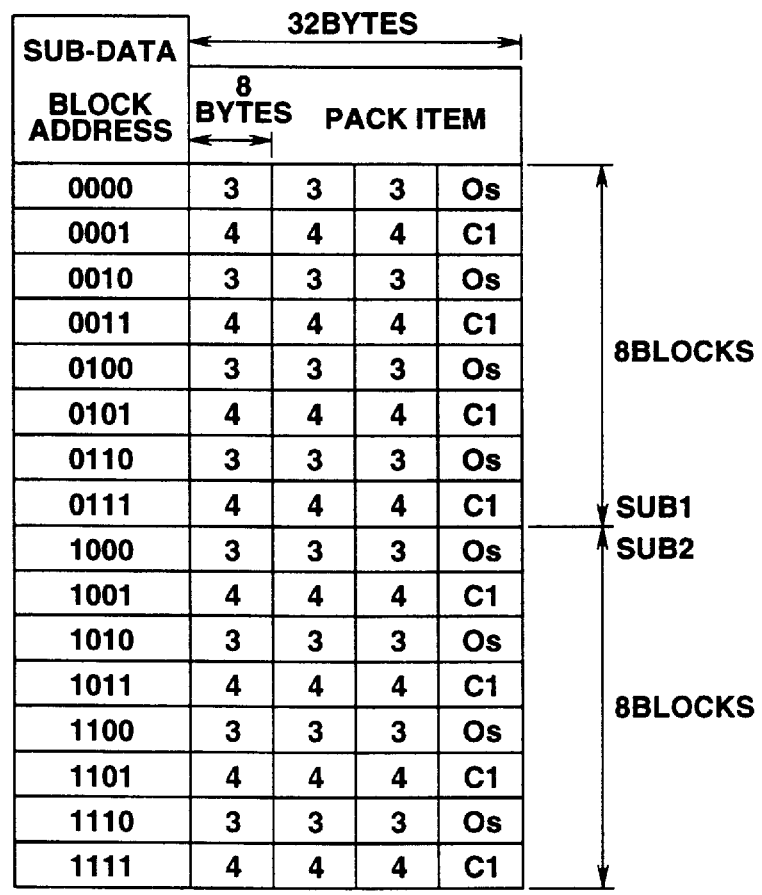
FIG. 14 illustrates a data structure of sub-data recorded in a sub-area of a recording track formed in a reference area, part of the system area and in the EOD area of a magnetic tape by the data storage device.

The sub-data recorded in the sub-areas of the recording tracks of the EOD area, reference area and in the remaining areas of the system area is substantially made up of pack items 3, 4. Specifically, as shown in FIG. 14, for blocks having even-numbered addresses and odd-numbered addresses, the above sub-data is made up of three pack items 3 and so forth and three pack items 4 and C1 parity, respectively.

In the present data storage device, eight sorts of the pack items making up the sub-data are defined, as shown in FIG. 15. These pack items are made up of 8-byte data PC1 to PC8. In all pack items, upper 4 bits of PC1 represent the ID of the pack item, while PC8 is parity.

In the pack item 1, the N position is recorded in lower three bits of PC1, the 16-bit group count is recorded in PC2 to PC3 and a 32-bit file mark count is recorded in PC4 to PC7, as shown in FIG. 15. The group count specifies which number data in the current partition is the 46-track group data containing the pack item 1. The file mark count specifies the number of file marks recorded in the current partition.

In the pack item 2, the N repeat is recorded in the lower 3 bits of PC1, the 16-bit save set mark count is recorded in PC2 to PC3 and the 32-bit record count is recorded in PC4 to PC7, as shown in FIG. 16. The save set mark count specifies the number of save set marks recorded in the current partition, while the record count specifies the number of records recorded in the current partition.

In the pack item 3, an area ID is recorded in the lower four bits of PC1, a 24-bit absolute frame count is recorded in PC2 to PC4, a 16-bit track 1 check sum is recorded in PC5 to PC6 and an 8-byte logical frame (LF)-ID is recorded in PC7, as shown in FIG. 17. The absolute frame count specifies the absolute value of the frame recorded in the current partition. The track 1 check sum specifies the check sum of data of the main data area of track 1, that is the recording track $T_A$, while the LF-ID includes the identification information for identifying if the frame containing the recording track containing in turn the pack item 3 is the frame of ECC or the last frame.

In the pack item 4, the area ID, absolute frame count and LF-ID, similar to those of the pack item 3, are recorded in the lower four bits of PC1, in PC2 to PC4 and in PC7, while the 16-bit track 2 check sum is recorded in PC5 to PC6, as shown in FIG. 18. The track 2 check sum specifies the check sum of data of the main data area of the track 2, that is the above recording track $T_B$.

In the pack item 5, the 20-bit data of the number of previous recording groups are recorded in the lower four bits of PC1 up to PC3, while the 32-bit data of the number of the total recording groups is recorded in PC4 to PC7, as shown in FIG. 19. The number of the previous recording groups specifies the number of groups recorded as from the last updating of the system area, while the total number of the groups specifies the total number of the groups recorded as from the time of formation of the partition.

In the pack item 6, 20-bit data of the number of previous read-out groups is recorded in the lower four bits of PC1 up to PC3, while 32-bit data of the total number of read-out groups is recorded in PC4 to PC7, as shown in FIG. 20. The number of previous read-out groups specifies the number of groups recorded as from the last updating of the system area, while the total number of the groups specifies the total number of the groups recorded as from the time of formation of the partition.

In the pack item 7, 24-bit data of the total number of rewrite frames is recorded in PC2 to PC4, while 24-bit data of the total third ECC count is recorded in PC5 to PC7, as shown in FIG. 21. The total number of rewrite frames specifies the total number of times the necessity for rewriting has arisen as from the time of the partition formation. This total number of rewrite frames specifies the number of times of error occurrence on the occasion of the read-after write mode recording in which data recorded during data recording is reproduced in order to check if the data has been recorded correctly. The total third ECC count specifies the total number of error correction of reproduced data by the C3 parity as from the time of the partition formation.

In the pack item 8, a 16-bit load count is recorded in PC2 to PC3, while the 16-bit previous third ECC count is recorded in PC6 to PC7, as shown in FIG. 22. The load count specifies the number of times a magnetic tape 32 has been pulled out of the cassette or the like and loaded for recording/reproduction as from the time of partition formation.

From these pack items 1 to 8, sub-data shown in FIGS. 12 to 14 are formed and arrayed in the respective blocks for recording.

Thus, the above pack items 3 or 4 are recorded once in each block in the sub-area of the recording track of the data area shown in FIG. 12 and in the system log area shown in FIG. 13, so that the area ID is recorded once in each block. That is, in combination with the area IDs in the sub-ID, the area IDs are recorded 12 times in each sub-area and 24 times in each recording track.

In the sub-areas of the recording tracks of the system area, reference area and the EOD area shown in FIG. 12, the pack item 3 or the pack item 4 is recorded three times in each block, so that the area IDs are recorded three times in each block. That is, in combination with the area IDs in the sub-ID, the area IDs are recorded 28 times in each sub-area and 56 times in each recording track.

Figure 23:
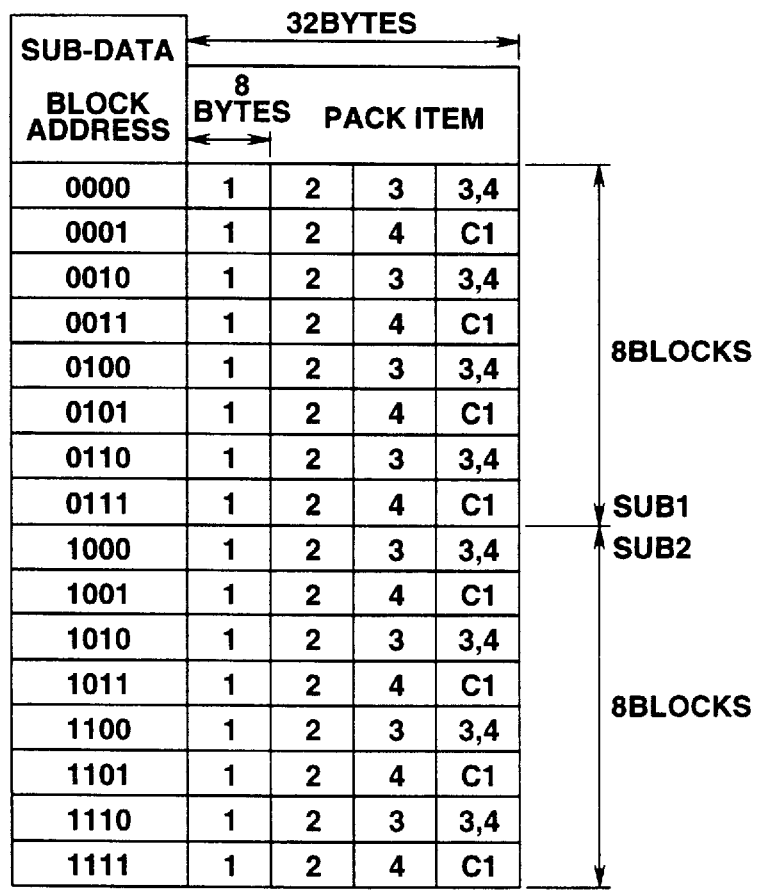
FIG. 23 illustrates the data structure of sub-data recorded in a sub-area of a recording track formed in the data area of the magnetic tape by the data storage device.

On the other hand, if the pack ID of the sub-ID is "111", seven pack items are recorded in two blocks. In this case, the sub-data recorded in the sub-area of the recording track of the data area is made up of pack items 1, 2, 3 and pack items 3 or 4 and of pack items 1, 2, 4 and C1 parity, for blocks having even-numbered block addresses and for blocks having odd-numbered block addresses, respectively, as shown in FIG. 23.

The sub-data recorded in the sub-area of the recording track of the system log area for recording the system log, is made up of pack items 5, 7, 3 and pack items 3 or 4 and of pack items 6, 8, 4 and C1 parity, for blocks having the even-numbered block addresses and for blocks having odd-numbered block addresses, respectively, as shown in FIG. 24.

The sub-data recorded in the sub-areas of the recording tracks of the EOD area, reference area and in the remaining areas of the system area is substantially made up of pack items 3, 4. Specifically, for blocks having even-numbered addresses and odd-numbered addresses, the above sub-data is made up of three pack items 3 and pack item 3 or 4, and three pack items 4 with C1 parity, respectively.

The area IDs, recorded as the sub-data, are extracted from the playback data, error corrected by the C3 decoder 46C, so as to be supplied to the histogram formulating unit 60 along with the area IDs from the 8/10 demodulator 43. This increases the number of samples of the area IDs for formulating the histograms. If the error rate becomes higher such that a large number of area IDs cannot be reproduced, the area IDs can be detected based on the reproduced remaining area IDs, thus realizing more reliable reproduction.

In the above embodiments, the present invention is applied to a data storage device, as a reproducing apparatus, and to detection of the area IDs appended in multiplicity to the recording data. The present invention may however be applied to a reception apparatus for reproducing data supplied over a transmission path.

In this case, the reception apparatus is fed over a radio path or a connection cable with a block of a pre-set length within which the identification information for block identification is appended in different positions in the block. The reception apparatus demodulates the supplied block, reproduces the identification information from the demodulated output and finds the reproduction frequency of the identification information by a reproduction frequency detection unit similar to the histogram formulating unit 60 shown in FIG. 1 in order to control reproduction of the received block based on the identification information.

With the reception apparatus, even if part of the identification information cannot be reproduced by noise in the transmission channel, the remaining identification information appended at different positions in the block can be reproduced. From the remaining identification information, the reproduction frequency of the identification information can be found for reproducing data depending on the reproduction of frequency. Thus, with the reception apparatus, the received data can be reproduced reliably.

We claim:

1. An apparatus for reproducing a series of data composed of a plurality of blocks each having a pre-set length, comprising:

means for reproducing a plurality of types of identification information repeated at a plurality of different positions in a specified block of said plurality of blocks for identifying the specified block;

detection means for detecting a reproduction frequency for each of said plurality of types of identification information; and control means for controlling data reproduction based on the reproduction frequency, wherein said control means determines the identification information of the specified block being reproduced based on the reproduction frequency of each of said plurality of types of identification information detected by said detection means having a maximum reproduction frequency larger than one of a plurality of pre-set threshold values, and controls data reproduction depending on the determined identification information, and wherein when the reproduction frequency of more than one of said plurality of types of identification information is equal, said control means identifies the specified block based on an order of priority set among the blocks.

2. The apparatus as claimed in claim 1, wherein said control means identifies the specified block based on said plurality of types of identification information detected by said detection means having a maximum reproduction frequency and controls the reproduction of data in said specified block.

3. The apparatus as claimed in claim 1, wherein said detection means detects the reproduction frequency of the identification information of a specified block among said plurality of blocks, and said control means identifies said specified block based on said reproduction frequency and identifies other blocks from said plurality of blocks by detecting that the identification information for blocks other than said specified block has been reproduced a number of times larger than another of said plurality of pre-set threshold values.

4. The apparatus as claimed in claim 1, wherein said control means sets said plurality of threshold values associated with plural reproduction modes and compares said reproduction frequency to one of said plurality of threshold values for controlling the reproduction of the selected reproduction mode.

5. The apparatus as claimed in claim 1, wherein said series of data is recorded on a tape-shaped recording medium and said plurality of blocks are recorded in a plurality of recording areas provided on the tape-shaped recording medium.

6. An apparatus for reproducing data from a recording medium including a recording area for recording data and an end area specifying an end of said recording area, said recording area including a plurality of pre-set length blocks at a plurality of different positions, to each of which is appended a first identification information specifying that a specified block is present in said recording area, and said end area including a plurality of pre-set length blocks at a plurality of different positions, to each of which is appended a second identification information specifying that a specified block is present in said end area, the apparatus comprising:

data reproducing means for driving said recording medium and reproducing data including said plurality of pre-set length blocks from said recording medium;

means for reproducing said first identification information and said second identification information included in each of said plurality of pre-set length blocks of the reproduced data;

means for detecting a reproduction frequency of each of the reproduced first identification information and the reproduced second identification information; and control means for controlling said data reproducing means in response to said reproduction frequency of said first identification information and said second identification information, wherein said control means judges one of the first identification information or the second identification information to be valid by comparing the reproduction frequency thereof to a pre-set threshold value for identifying said recording area or said end area, and wherein said control means controls said data reproducing means based on the area having the identification information judged to be valid, and wherein when the reproduction frequency of said first identification information is equal to the reproduction frequency of said second identification information said control means judges that the reproduced data is present in said end area and performs reproduction control associated with said end area.

7. The apparatus as claimed in claim 6, comprising means for detecting a first number of times of occurrences of coincidences specifying that the first identification information has been detected continuously, and wherein said control means controls said data reproducing means based on said reproduction frequency of said first identification information and the first number of times of occurrences of coincidences.

8. The apparatus as claimed in claim 7, wherein said means for detecting the number of times of occurrences of coincidences detects a second number of times of occurrences of coincidences specifying that said second identification information has been detected continuously, and wherein said control means controls the reproduction by said data reproducing means for said recording area based on the second number of times of occurrences of coincidences.

9. The apparatus as claimed in claim 6, wherein said recording medium is a tape-shaped recording medium, and said end area and said recording area having a plurality of tracks, each of said plurality of tracks including a plurality of blocks having one of said first identification information and said second identification information.

10. An apparatus for reproducing data from a recording medium including a recording area for recording data and an end area specifying an end of said recording area, said recording area including a plurality of pre-set length blocks at a plurality of different positions, to each of which is appended a first identification information specifying that a specified block is present in said recording area, and said end area including a plurality of pre-set length blocks at a plurality of different positions, to each of which is appended a second identification information specifying that a specified block is present in said end area, the apparatus comprising:

data reproducing means for driving said recording medium and reproducing data including said plurality of pre-set length blocks from said recording medium;

means for reproducing said first identification information and said second identification information included in each of said plurality of pre-set length blocks of the reproduced data;

means for detecting a reproduction frequency of each of the reproduced first identification information and the reproduced second identification information; and control means for controlling said data reproducing means in response to said reproduction frequency of said first identification information and said second identification information, wherein said control means judges one of the first identification information or the second identification information to be valid by comparing the reproduction frequency thereof to a pre-set threshold value for identifying said recording area or said end area, and wherein said control means controls said data reproducing means based on the area having the identification information judged to be valid, wherein said recording medium is a tape-shaped recording medium, and said end area and said recording area having a plurality of tracks, each of said plurality of tracks including a plurality of blocks having one of said first identification information and said second identification information, and wherein said data reproducing means includes at least a reproducing mode for normal reproduction at a normal speed of said tape-shaped recording medium, and a search mode for fast search at a speed higher than the normal speed for said reproducing mode for normal reproduction, and wherein said control means compares the reproduction frequency of said first identification information to a pre-set threshold valued set to a value smaller than that for the reproducing mode if said data reproducing means is in said search mode, thereby rapidly identifying said end area.

11. The apparatus as claimed in claim 10, wherein said tape-shaped recording medium is made up of a plurality of partitions, and wherein said end area is provided at an end of each of said partitions.

12. The apparatus as claimed in claim 11, wherein said end area provided in each of said plurality of partitions includes a first identification of different types of identification information.

13. The apparatus as claimed in claim 12, further comprising means for detecting a number of times of occurrences of coincidences specifying that said first identification information has been continuously reproduced, and wherein said control means identifying said end area during the search mode of said data reproducing means based on the reproduction frequency of said first identification information.

* * * * *